US006985365B2

(12) United States Patent
Krontz et al.

(10) Patent No.: US 6,985,365 B2
(45) Date of Patent: Jan. 10, 2006

(54) TOPOLOGY FOR FLEXIBLE AND PRECISE SIGNAL TIMING ADJUSTMENT

(75) Inventors: Jeoff M. Krontz, Tomball, TX (US); Christopher D. McBride, Austin, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 823 days.

(21) Appl. No.: 09/966,649

(22) Filed: Sep. 28, 2001
(Under 37 CFR 1.47)

(65) Prior Publication Data

US 2003/0071671 A1 Apr. 17, 2003

(51) Int. Cl.
*H05K 7/06* (2006.01)
*H01P 1/18* (2006.01)

(52) U.S. Cl. ...................... 361/777; 361/782; 333/161; 710/306

(58) Field of Classification Search ................ 710/306; 333/164, 161, 159, 156, 130; 307/38, 106; 174/261; 361/760, 777, 778, 782, 805
See application file for complete search history.

(56) References Cited

U.S. PATENT DOCUMENTS 4,313,095 A * 1/1982 Jean-Frederic .............. 333/116
4,906,987 A * 3/1990 Venaleck et al. ........... 361/778
5,224,022 A * 6/1993 Weigler et al. ............. 361/777
5,418,455 A * 5/1995 Takaishi et al. ....... 324/207.21
5,542,049 A * 7/1996 Kurokawa et al. .......... 710/100
5,578,976 A * 11/1996 Yao ........................... 333/262
5,801,601 A * 9/1998 Gayle ......................... 333/156
5,805,428 A * 9/1998 Singer ........................ 361/777
5,847,985 A * 12/1998 Mitani et al. ................. 365/63
5,987,531 A * 11/1999 Ikeda et al. .................... 710/8
6,034,878 A * 3/2000 Osaka et al. .................. 365/52
6,233,157 B1 * 5/2001 Yoon et al. ................. 361/760
6,274,824 B1 * 8/2001 Rueda-Aguilocho et al. .......................... 174/261
6,281,838 B1 * 8/2001 Hong ......................... 342/371
6,734,757 B2 * 5/2004 Delzer ........................ 333/161
6,763,416 B1 * 7/2004 LaBerge ..................... 710/305

OTHER PUBLICATIONS

Google Search: define:clock (one sheet).*

* cited by examiner

*Primary Examiner*—John B. Vigushin

(57) ABSTRACT

The system and methods describe a computer system implementing an adjustable control signal path whose length may be precisely adjusted to control timing of a control signal that propagates along the path. One such adjustable signal path has two clusters of possible signal paths. Each of the signal paths in each cluster has a length, and the overall length of the control signal path may be adjusted by selectively implementing one signal path from each of the clusters by electrically connecting that path into the electrical circuit by the selective installation of zero ohm resistors. In this way, a system designer may design several possible signal path lengths on to a motherboard or printed circuit card, and implement the path length which provides the most precise signal timing adjustment.

29 Claims, 4 Drawing Sheets

TOPOLOGY FOR FLEXIBLE AND PRECISE SIGNAL TIMING ADJUSTMENT

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The present invention relates generally to computer systems with internal operational speeds and components that impose timing constraints on clock and control signals distributed about the system. More particularly, the present invention relates to a topology for a flexible system for adjusting clock and control signal path lengths and therefore signal timing adjustments.

2. Background of the Invention

Modern computer systems are a conglomeration of components. Each component is designed and/or programmed to perform one or more specific tasks. However, for overall operation of the computer system to be successful, those various components must communicate with one another and exchange information. That exchange of information could be of data related to the particular application running on the system, or could be instructions of the software program itself moved from mass storage devices or random access memory to the microprocessor for execution. Regardless of the receiving and sending device in any transfer of data or programs, there must be some coordination between the devices to make sure that information is exchanged at the proper times.

Exchange of information in modem computer systems is typically completed by the exchange of a block of information in a synchronous manner. That is, modem computer system components are interconnected by a series of bus structures capable of transmitting a predefined amount of data at any one time, e.g., 64 bits of information at a time. The "synchronous" descriptor means that the exchange of information between a sending device and a receiving device is done at predefined times typically based upon a host clock signal that is available for all the components of the computer system to use as a time reference.

As computer microprocessor and bus transfer speeds increase, factors such as the speed of propagation of signals within the computer begin to come into play. For purposes of illustration, consider the generic transfer of information depicted in FIG. 1 from a sending device 2 to a receiving device 4 along an arbitrary bus 6. Although the propagation of electrical signals along wires and traces of printed circuit boards is extremely fast, on the order of one inch in every $200\times10^{-12}$ seconds (200 pico-seconds (ps)), the speed is finite. Thus, in the generic system of FIG. 1, the information driven to the bus 6 by the sending device 2 is not instantaneously available at the receiving device 4; rather, the availability of the data driven by the sending device 2 at the receiving device 4 is, in part, a function of the distance between those two devices. Thus, if the sending device clock 8 and the receiving device clock 10 in FIG. 1 are exactly in phase (rise and fall at exactly the same time), and there is a fairly significant distance between the two devices (on the order of several inches on a computer circuit board), then the exchange of information will not occur if the sending device 2 drives on the leading edge of the send clock 8 and the receiving device simultaneously tries to read that information on the rising edge of the read clock 10. To compensate for such a situation, and referring to FIG. 2, related art devices compensate for propagation delay, among other things, by shifting or skewing the clocks between the sending and receiving devices. With regard to the generic transfer of information between the sending device 2 and the receiving device 4 of FIG. 1, related art devices shift in time the read clock away from the send clock as exemplified in FIG. 2. That is, the send clock and the read clock have the same frequency but are shifted in phase such that there is a finite amount of time $\Delta T$ between the rising edge of the send clock and the rising edge of the read clock. This amount of time $\Delta T$ is sufficient to allow the signals driven by the sending device to onto the bus 6 to propagate along the length of the bus and become available at the receiving device 4.

In the design of motherboards and other computer system components, it is usually not known in advance the exact timing required between particular devices or components. That is, a board designer may known the distance between a bridge device and a main memory device, for example, but that designer may not know the timing constraints of the particular components to be installed. In the related art, some designers compensated for this lack of knowledge at the design phase of the board by designing in clock signal paths having varying lengths. Once the components are installed, or the timing constraints otherwise determined, the particular clock signal path which meets the timing constraints of the particular system is used. FIG. 3 shows one related art method for adjusting the signal path lengths for a system clock. In particular, FIG. 3 shows a clock source 12 coupled to a clock destination 14 by way of a plurality of clock paths 16 (for the shorter path) and 18 (for the longer path). In such a system, each of these paths 16 and 18 are designed onto the printed circuit board in advance, not knowing which path represents the correct signal timing delay for the components of the system. Once the individual components are identified and testing performed on the board, the particular path that represents the signal path length closest to what was needed in the system is selected jumpering, by one of several known techniques, the connections at each end of the path desired. More particularly, the connections 20 and 22 would be electrically connected to allow the clock source to propagate along the shorter path 16, if that was the desired path, and jumpers 24 and 26 would be connected if the signal path length along the longer path 18 is desired.

However, related art implementation such as that shown in FIG. 3 have several problems. First, in such a design there are only two possible signal path lengths. Thus, such a system would not compensate for the situation where the optimum signal path length is somewhere between the short path 16 and the long path 18 lengths. In such a situation, system designers typically choose the shorter path length and compensate by adding capacitance. Adding capacitance, while having the effect of slowing the rise times associated with that clock, may only be used to a certain extent before clock signal degradation becomes a problem.

Secondly, if the system of FIG. 3 is used, there are several dead-end paths, or stubs, that the propagating clock signal may take. For example, the clock signal propagates from the clock source 12 out to the branch point 28. If it is assumed that the short path length is selected and jumpers are placed at locations 20 and 22 to complete the short path circuit, some of the clock signal propagates toward the open jumper 24 and reflects at that location back toward the clock signal. Likewise this occurs at the other end with regard to the open jumper location 26. These reflecting waves interfere with the clock signal and cause signal degradation.

Finally, printed circuit board space on motherboards, and the like, is a premium, thus not allowing a system designer the capability of designing in several clock paths, e.g., nine or more, from which to choose later on.

Thus, what is needed in the art is a flexible and precise signal timing adjustment system that gives the system designer the maximum number of possible signal path lengths without the draw backs of using an inordinate amount of circuit board space, and without the detrimental effects associated with interference of electromagnetic signals based on reflection in stub circuits.

BRIEF SUMMARY OF THE INVENTION

The preferred embodiments relate to a structure and related method for adjusting the lengths of clock and control signal paths. More particular, the preferred embodiments relate to a topology for precisely setting the length of control and clock signal paths, and relying upon propagation times of signals along those paths to make signal timing adjustments. The preferred structure comprises at least two groups or clusters of signal paths. Each of the signal paths from the two groups or clusters preferably have different lengths such that a system designer may choose a first signal path from the first group or cluster, and a second signal path from the second group or cluster, and by selecting signal paths from the first and second group of particular lengths, the system designer may therefore control the overall length of the clock or control signal path which allows the system designer to adjust the timing of that control signal. That is, for a control or clock signal for which very little time delay is required, the system designer chooses the shortest possible path through the clusters of signal paths being an adjustable signal path circuit. On the other hand, if the system designer needs to time delay or phase lag a particular control or clock signal, the designer chooses longer signal path lengths from the first and second cluster and couples them together to make a control signal path whose length is precisely adjusted to give the desired time delay.

Preferably, the clusters of signal paths are implemented on a motherboard or other printed circuit board (PCB) in any control or clock path where timing adjustments need to be made. The motherboard or PCB card preferably has the multiple clusters of signal paths designed onto the board and the system designer selects a particular signal path from each cluster of signal paths by selectively installing zero ohm resistors. That is, each of the signal paths have ends that are proximate to an electrical contact or solder pad on the motherboard or PCB card. The system designer preferably installs zero ohm resistors from the electrical contacts or solder pads to the selected signal path, and does not install or otherwise connect to the electrical pad or solder pad to the remaining signal paths. This selective installation of zero ohm resistors is preferably done on each end of each signal path and in this way the overall adjustable signal path circuit does not have any studs or open circuit paths down which electrical waves may propagate and reflect thereby causing signal degradation in the main clock or control signal.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
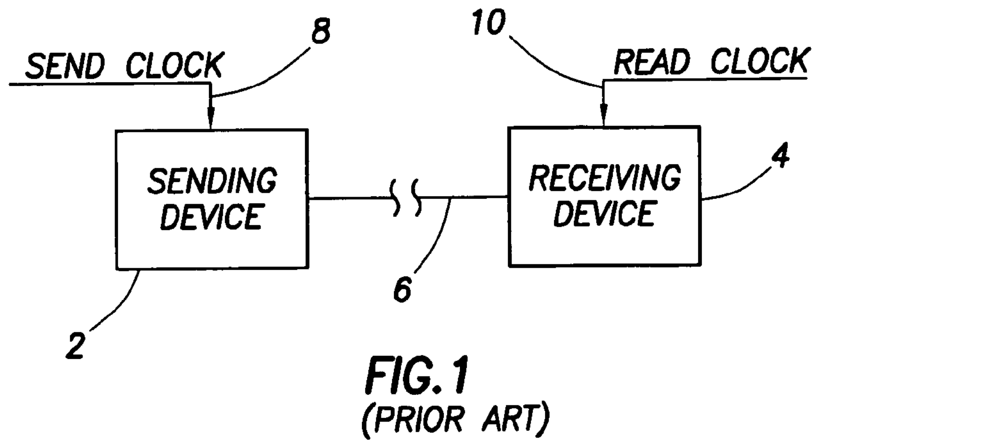
FIG. 1 shows hardware associated with a generic transfer of information from a sending device to a receiving device.
Figure 2:
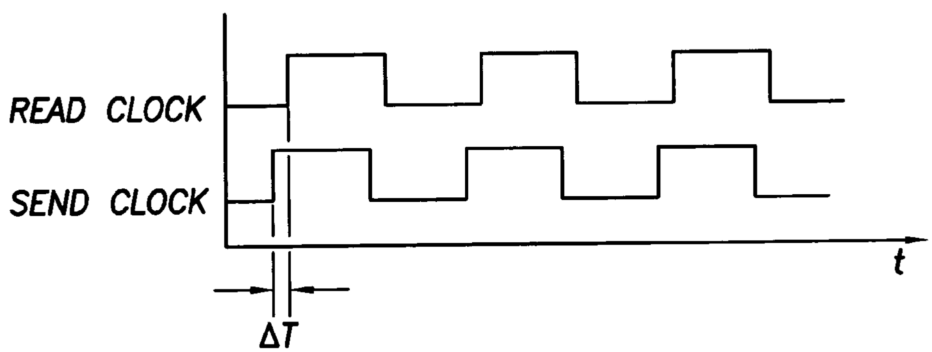
FIG. 2 shows a timing diagram of the phase relationship between a send clock and a read for the generic system shown in FIG. 1.
Figure 3:
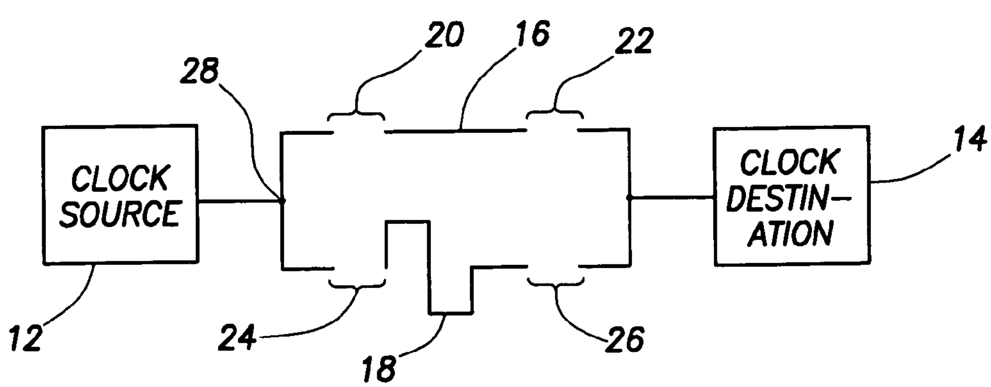
FIG. 3 shows a related art system having only two non-adjustable signal paths.
Figure 4:
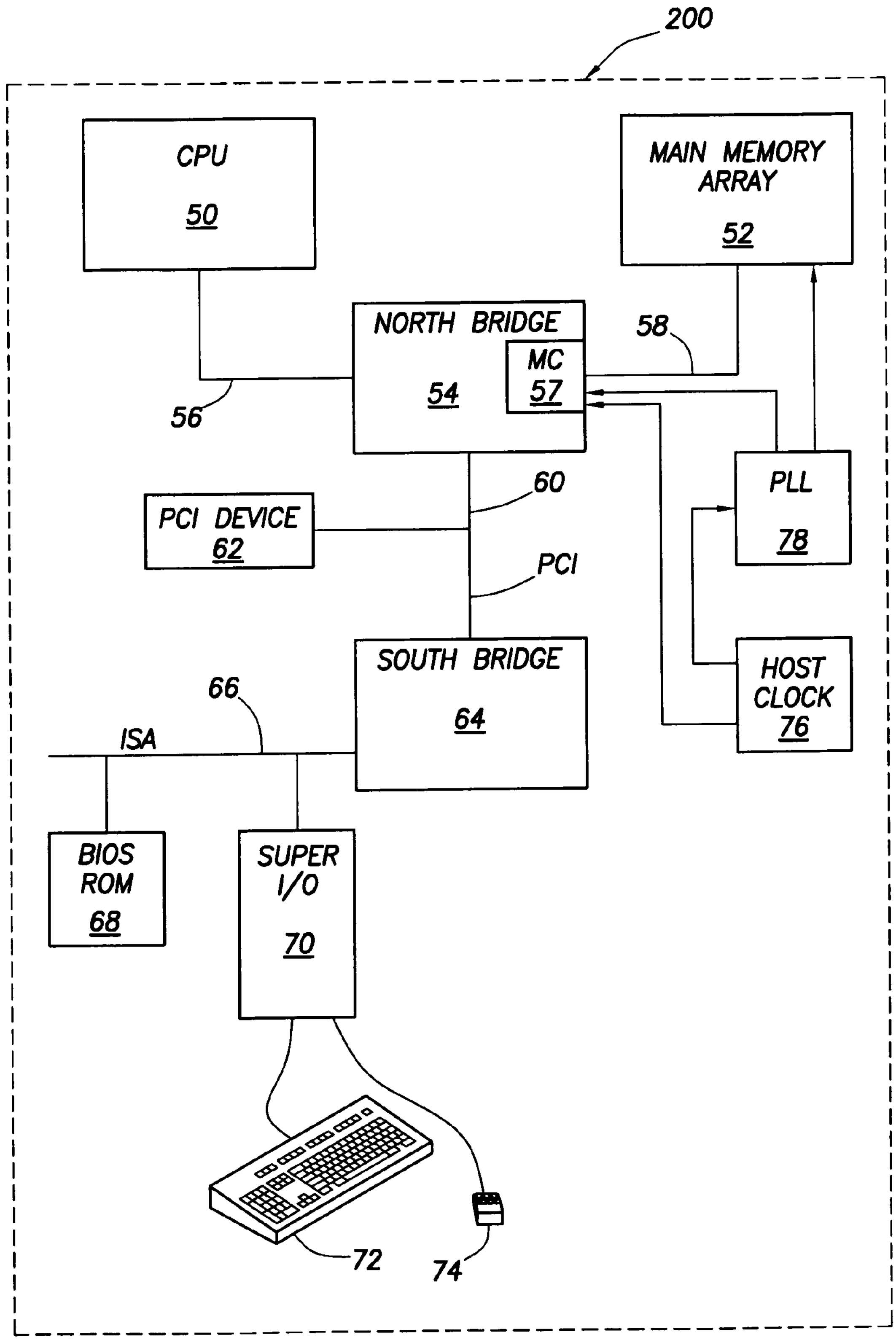
FIG. 4 shows a computer system of the preferred embodiment.

Referring now to FIG. 4, computer system 200, in accordance with the preferred embodiment preferably comprises a micro-processor or CPU 50 coupled to a main memory array 52 through an integrated bridge logic device 54. As depicted in FIG. 4, the bridge logic device 54 is sometimes referred to as a "North bridge," based generally upon its location within a computer system drawing. The CPU 50 preferably couples to the bridge logic 54 via a CPU bus 56, or the bridge logic 54 may be integrated into the CPU 50. The CPU 50 preferably comprises a Pentium III® microprocessor manufactured by Intel. It should be understood, however, that other alternative types and brands of microprocessors could be employed. Further, an embodiment of computer system 100 may include multiple processors, with each processor coupled through the CPU bus 56 to the bridge logic unit 54. To increase memory capability, and memory bus bandwidth, multiple bridge logic units 54 may be used, each coupled to its own main memory array 52.

The main memory array 52 preferably couples to the bridge logic unit 54 through a memory bus 58, and the bridge logic 54 preferably includes a memory control unit 57 that controls transactions to the main memory by asserting the necessary control signals during memory accesses. The main memory array may comprise any suitable type of memory such as dynamic random access memory (DRAM), any of the various types of DRAM devices, or any memory device that may become available in the future.

The North bridge 54 bridges various buses so that data may flow from bus to bus even though these buses may have varying protocols. In the computer system of FIG. 4, the North bridge 54 couples to a primary expansion bus 60, which in the preferred embodiment is a peripheral component interconnect (PCI) bus. FIG. 4 also shows a PCI device 62 coupled to the primary expansion bus 60. PCI device 62 may be any suitable device such as a modem card or a network interface card (NIC). One skilled in the art will realize that multiple PCI devices may be attached to PCI bus 60, yet for clarity of the figure, only one is shown.

A preferred embodiment if computer system 200 further includes a second bridge logic device, a South bridge 64, coupled to the primary expansion bus 60. This South bridge 64 couples, or bridges, the primary expansion bus 60 to other secondary expansion buses. These other secondary expansion buses may include an industry standard architecture (ISA) bus 66, a sub-ISA (not shown), a universal serial bus (not shown), and/or any of a variety of other buses that are available or may become available in the future. In the embodiment shown in FIG. 4, the South bridge 64 bridges Basic Input Output System (BIOS) Read Only Memory (ROM) 68 to the primary expansion bus 60, therefore, programs contained in the BIOS ROM 68 are accessible by the CPU 50. Also attached to the ISA bus 66 is Super Input/Output (Super I/O) controller 70, which controls many system functions, including interfacing with various input and output devices, such as keyboard 72. The Super I/O controller 68 may further interface, for example, with a system pointing device such as a mouse 34, various serial ports (not shown) and floppy drives (not shown). The Super I/O controller is often referred to as "super" because of the many I/O functions it may perform.

The BIOS ROM 68 preferably contains firmware embedded on a ROM memory chip and performs a number of low-level functions. For example, the BIOS executes the power on self test (POST) during system initialization ("boot-up"). The POST routines test various subsystems in the computer system, isolate faults and report problems to the user. The BIOS is also responsible for loading the operating system into the computer's main system memory. Further, the BIOS handles the low-level input/output transactions to the various peripheral devices such as the hard disk drive and floppy disk drives.

Also shown in FIG. 4 is a host clock 76. The host clock 76 output signal preferably couples to many of the computer system 200 components, including the CPU 10 and South bridge 64 (those connections are not shown in FIG. 4 for simplicity of the drawing). FIG. 4 does however show the host clock outputs coupling one each to the memory controller 58 of the North bridge 54, and to the phase locked loop (PLL) 78. The host clock signal coupled to the memory controller 58 is preferably used by the memory controller 58 to write data to the memory bus 58 during movement of data from the North bridge 54 to the main memory array 52.

The phase locked loop 78 is a device that takes a single input signal, here the host clock signal from the host clock 76, and produces a plurality of output signals having the same frequency as the input signal but shifted in phase. More particularly, the PLL has a feed-back path (not shown), the length of which controls the phase relationship between the many outputs of the PLL 78 and the PLL input. The phase relationships between the PLL 36 output and its input is a function of the length of the feed-back path between the FB Out pin and the FB In pin (not shown). An example of a phase lock loop having these characteristics is a device made by Cypress Semiconductor Corporation, part number CY 2510. Although the PLL output signals may couple to many devices within the computer, FIG. 4 shows two such PLL output signals coupling one each to the memory controller 58 and the main memory array 52.

Figure 5:
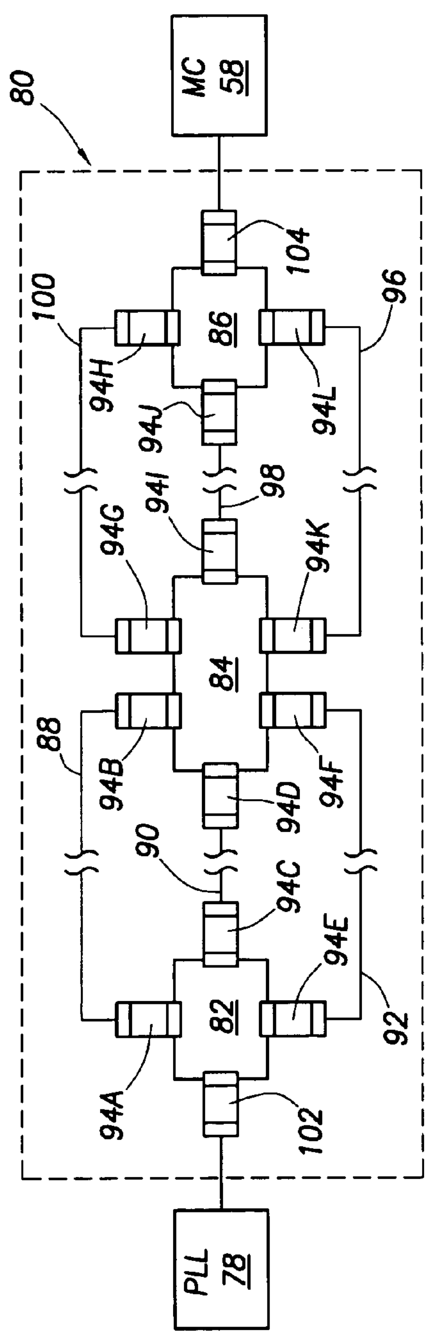
FIG. 5 shows an adjustable signal path circuit coupling a phase locked loop device as a signal source and a memory controller as a signal destination.

FIG. 5 shows an embodiment of a signal path topology for signal timing adjustments. In particular, FIG. 5 shows the phase locked loop device 78 coupled to the memory controller 58 by way of an adjustable signal path circuit 80. An embodiment of the adjustable signal path circuit 80 preferably comprises three solder pads 82, 84 and 86, which may alternatively be referred to as contact pads, electrical contacts or intersection points. These pads are preferably implemented on a printed circuit board (PCB) card such as a mother board for a computer system. These pads are preferably a highly electrically conductive material such as aluminum, which may be placed at any location on a printed circuit board as desired. Indeed, these pads 82, 84 and 86 need not be placed on the same side of the board or even on the same level of a multiple level board. These three pads 82, 84 and 86 are preferably coupled by a plurality of traces which form signal paths, preferably having varying lengths. The combination of a solder pad and zero ohm resistors electrically connecting the various selected paths to the solder pad may be referred to as a spanning circuit inasmuch as this combination of elements spans (electrically connects) selected signal paths from each of the various clusters. More particularly, and still referring to FIG. 5, an embodiment comprises a series of signal paths on a printed circuit board coupling the first pad 82 to the second pad 84. These signal paths are preferably of varying lengths and coupled on each end to the pads 82 and 84 by way of zero ohm resistors 94. By selectively installing these zero ohm resistors, which are preferably low profile devices mounted by pick and place machines during the construction of the motherboards, a system designer may choose the path length, in the exemplary embodiment of FIG. 5, between the PLL 78 and the memory controller 58.

Assuming for purposes of explanation that a system designer wishes to implement path 88 between pads 82 and 84, during the process of installing the various components on the motherboard or other PCB card, only resistors 94A and 94B are installed. Thus, the PLL clock signal propagates from the control signal source PLL 78 to the pad 82 (across resistor 102 which is described in more detail below), up through resistor 94A across the signal path 88, down through resistor 94B and to the second pad 84. In this exemplary embodiment, none of the resistors 94C–94F would be installed and thus no electrical path would exist along signal paths 90 and 92. Moreover, the system designer also preferably makes adjustments to the overall control signal path by selectively installing resistors 94G–94L in the second cluster of signal paths shown in FIG. 5. For example, the system designer may implement the signal path 96 of the second cluster so that the overall signal path comprises the trace length from the PLL to the first pad, from the first pad along path 88 to the second pad, from the second pad 84 along path 96 to the third pad 86, and from the third pad 86 to the control signal destination, which in FIG. 5 is the memory controller 58.

It is assumed, but not required, that each of the traces 88, 90 and 92 in the first cluster, and traces 96, 98 and 100 in the second cluster, have a different length. Thus, a system designer may choose a plurality of different signal path lengths by selectively installing resistors 94A–94L. Still referring to FIG. 5, and assuming that the signal path lengths are substantially as shown in FIG. 5, it is seen that the shortest path for the clock signal to travel from the PLL 78 to the memory controller 58 is through the first cluster by way of signal path 90, and through the second cluster by way of signal path 98. Likewise, in the exemplary embodiment of FIG. 5, the longest path length could be implemented by the clock signal traveling through the first cluster by way of signal path 88 or 92 and through the second cluster by way of signal path 96 or 100.

Figure 6:
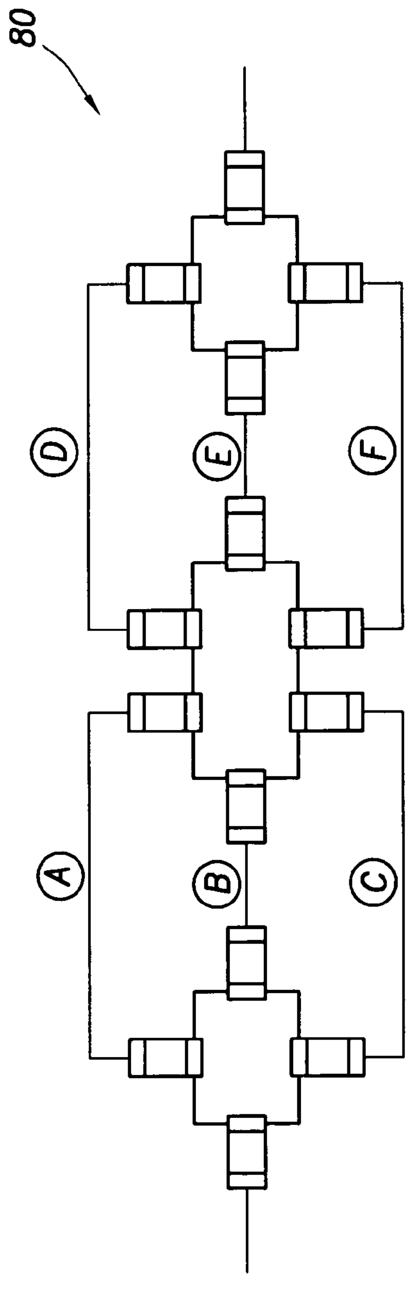
FIG. 6 shows an embodiment of an adjustable signal path circuit similar to that of FIG. 5.

Although embodiments that have duplicate signal path lengths among the various clusters are within the contemplation of this invention, in the preferred embodiment each of the signal path lengths are different, thereby allowing the system designer the maximum number of possible signal path lengths with which to tune the timing signals in the computer system 200. Referring now to FIG. 6 there is shown an embodiment similar to that of FIG. 5 for purposes of explaining the benefits and advantages of having signal paths with varying lengths. In particular, FIG. 6 shows the signal paths of the first cluster, comprising paths A, B, and C, and the signal paths of the second cluster D, E, and F. Further assume that each of these signal paths A–F have a length (of arbitrary unity as indicated in Table 1.

TABLE 1

| | |
|---|---|
| A | 0.25 |
| B | 0.5 |
| C | 0.75 |
| D | 1.0 |
| E | 1.25 |
| F | 1.50 |

Table 1 shows that for this embodiment, each of the signal paths A–F have a length different than the others ranging from 0.25 units to 1.50 units. The units of these lengths could be any length included but not limited to inches and centimeters. The unit of length desired is a function of the amount of delay required in the particular system. An adjustable signal path circuit 80 having the signal path lengths described in Table 1 gives a total of 9 unique signal paths through the signal path circuit. In particular, Table 2 shows each unique signal path, and that signal path's length given the arbitrary units assigned in Table 1.

TABLE 2

| | |
|---|---|
| AD | 1.25 |
| AE | 1.5 |
| AF | 1.75 |
| BD | 1.5 |
| BE | 1.75 |
| BF | 2.0 |
| CD | 1.75 |
| CE | 2.0 |
| CF | 2.25 |

Table 2 thus shows that for the unique path through the adjustable signal path circuit 80 comprising the signal paths A and D of FIG. 6 (AD in Table 2), the total length given the assigned values in Table 1 is 1.25 units. Similarly, unique path AE has a length of 1.5 units. Thus, Table 2 shows that for the two cluster system, each cluster containing three possible paths, there are nine unique signal paths that the clock signal may take. Table 2 also exemplifies that even using the path lengths given in Table 1, where each path length is different, there are still duplicate overall path lengths. In particular, Table 2 shows that path AE is equivalent in length to path BD, path AF is equivalent in length to BE and CD, and path BE is equivalent in length to path CE. Although an embodiment of the present invention could use an adjustable signal path circuit where some of the multiple unique paths have the same length, preferably the lengths of the signal paths are selected such that no two signal paths through the adjustable signal path circuit have the same length. While there may be many possible selections for signal paths that do not give duplicate lengths, Table 3 shows an exemplary selection for the path lengths that gives an overall adjustable signal path circuit selection ranging from 1.33 units to 4.0 units.

TABLE 3

| | |
|---|---|
| A | 1 |
| B | 2 |
| C | 3 |
| D | .33 |
| E | .66 |
| F | 1.0 |

TABLE 4

| | |
|---|---|
| AD | 1.33 |
| AE | 1.66 |
| AF | 2.0 |
| BD | 2.33 |
| BE | 2.66 |
| BF | 3.0 |
| CD | 3.33 |
| CE | 3.66 |
| CF | 4.0 |

Thus, it is seen that the unit lengths assigned in Table 3 (which could realistically be of the units inches) gives signal path lengths of Table 4 ranging from 1.33 units to 4.0 units, with each increment mapping to approximately ⅓ of a unit length.

Preferably then a system designer, when choosing the various components to install on a motherboard or other PCB card, will know, based on manufacturers data for those components, roughly what the signal timing characteristics for each of those components needs to be. While the system designer may have this rough idea in the stage of the engineering process where components are selected, that designer may not know until a prototype is implemented the exact timing signal relationship. Alternatively, it is possible that motherboards or PCB cards are designed based upon a component selection that may change. For example, many microprocessors may plug into a standard zero insertion force (ZIF) socket. That is, microprocessors from Intel® as well as AMD may each fit into a particular location on a motherboard or PCB card, but each may have differing signal timing requirements. Thus, a motherboard or PCB card, whose layout and design is finalized well in advance of the system designer knowing what components may be used, preferably implements an adjustable signal path circuit such as 80 with the path lengths selected such that the system designer has a range of possible lengths to implement depending on parameters and variables that are not determined at the time of the motherboard or PCB card finalization. Once the signal timing requirements are determined for a particular motherboard or PCB card configuration, the system designer chooses a particular path in the adjustable signal path length circuit to accommodate that signal timing. Thereafter, each motherboard or PCB card populated with various devices selectively has the zero ohm resistors populated only for those signal paths desired in the particular implementation.

Referring still to FIG. 6, it is noted that the topology given in FIG. 6, and those equivalent to it, have an advantage that for any signal path that is not implemented (that is for any signal path for which the zero ohm resistors on its path beginning and path end are not installed), there are no dead-end paths or stubs. As clock signals propagate along a wire or trace on a PCB card, the signal splits at each junction and propagates in each direction. An open circuit acts as a reflector for that signal. That is, the portion of the clock signal that propagates along the dead-end path, reflects at the end and propagates back toward the junction. When the reflective signal meets with the continuing clock signal, interference occurs which may degrade signal integrity in the system. However, in the embodiment shown in FIG. 6, any path that is not implemented by virtue of its not having the zero ohm resistor installed on its beginning and end, does not leave dead-end paths or stubs.

Figure 7:
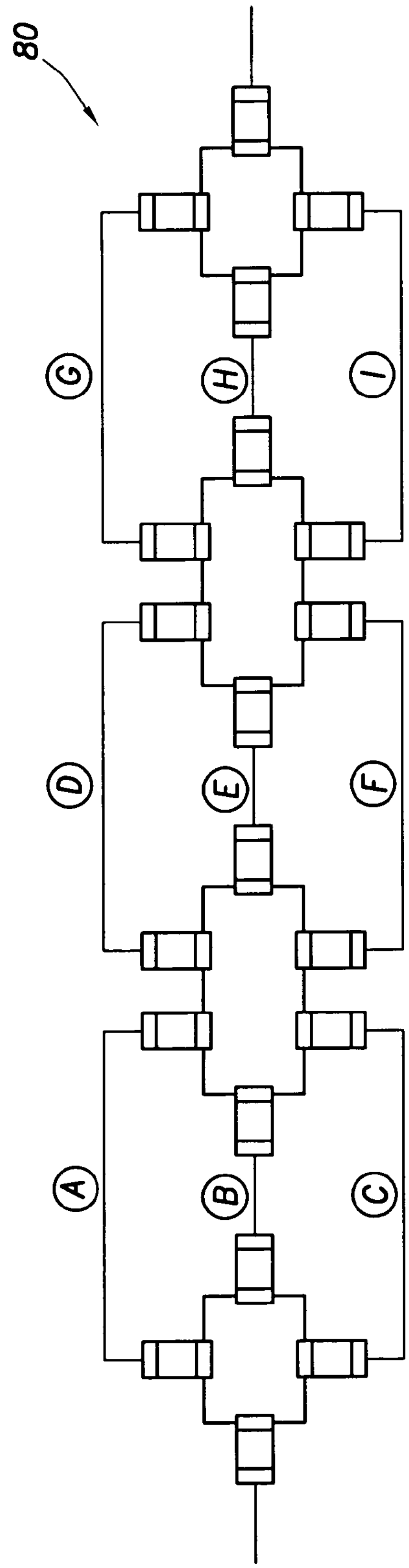
FIG. 7 shows an adjustable signal path circuit comprising three groups or clusters of available signal paths.

It must be understood that FIGS. 5 and 6 show only exemplary embodiments. There are many implementations of an adjustable signal path circuit 80 that fall within the contemplation of this invention. For example, FIG. 7 shows an adjustable signal path circuit 80 that comprises three clusters, with each cluster having three separate paths. In the configuration shown in FIG. 7, there are 27 unique signal paths. One of ordinary skill in the art, now understanding the possible paths the clock or control signals may take through the two cluster arrangement shown in FIG. 6 can easily determine the unique paths through the three cluster arrangement shown in FIG. 7. With careful selection of the lengths of the various paths in the three cluster arrangement shown in FIG. 7, the system designer may have as many 27 unique signal path lengths with which to adjust the timing relation of clock signals on a motherboard or a PCB card in which such a system is implemented.

Table 5, given below, exemplifies a length selection for each of the signal paths for the three cluster arrangement shown in FIG. 7 that produces no duplicate signal path lengths.

TABLE 5

| | |
|---|---|
| A | 10 |
| B | 13 |
| C | 16 |
| D | 1 |
| E | 2 |
| F | 3 |
| G | .33 |
| H | .66 |
| I | .10 |

Here again, the actual lengths of the signal paths given in Table 5 are arbitrary units (although in this case a more realistic unit for the lengths given in Table 5 may be millimeters or centimeters rather than inches). Using the signal path lengths given in Table 5 for the three cluster arrangement, the system designer has 27 possible signal path lengths ranging from 11.33 units to 20.0 units in 0.33 unit steps.

Thus, it is seen that the embodiments of the invention give the system designer a topology for signal timing adjustments that is highly flexible and may be easily and precisely tuned for the particular components on the motherboard or PCB card. Referring back to the computer system 200 shown in FIG. 4, an adjustable signal path circuit 80 could be implemented anywhere in the computer system where the system designer needs to vary the length of a signal path, be it for a clock circuit or any other control signal propagating within the computer system. Preferably, however, the timing constraints between the memory controller 57 and the main memory array 52 may require that the clock signals feeding each of these devices (it is noted that the memory controller 58 has a clock signal both from the host clock 76 and the PLL 78) preferably implement one of these variable length signal path circuits so that the timing signals for reads and writes between them may be adjusted.

All the various embodiments shown in the drawings (FIGS. 5–8) show zero ohm resistors on the path that leads to the first pad of the first cluster, and zero ohm resistors coupling the trace leading away the last pad of the last cluster. More particularly, and referring to FIG. 5, the adjustable signal path circuit 80 is shown to have a zero ohm resistor 102 coupled between the PLL 78 and the first pad 82 of the first cluster of signal paths. Likewise, the adjustable signal path circuit 80 also has another zero ohm resistor coupling the last pad 86 of the second cluster to the memory controller 58. In the specific embodiment shown in FIG. 5, the resistors 102 and 104 may be replaced simply by coupling the PLL 78 to the pad 82 directly, and likewise coupling the pad 86 to the memory controller 58 directly. However, these resistors are shown in FIG. 5 (and the remaining embodiments shown in FIGS. 6–8) to exemplify that it is not necessary that only a single adjustable signal path circuit be used in any particular location. That is, if the system designer is unsure of the length required for the signal path that may be accommodated by one of the adjustable signal path circuits 80, it is possible that multiple adjustable signal path circuits 80 may be placed in parallel on a motherboard or PCB card. As components are selected and signal timing relationships solidify into more distinct ranges, the system designer may implement any one of these parallel implementations of adjustable signal path circuits by insuring, at the time of population of the motherboard or PCB card, that the zero ohm resistors coupling the traces are installed on the adjustable signal path circuit which provides a range closest to the calculated or estimated signal path length.

Figure 8:
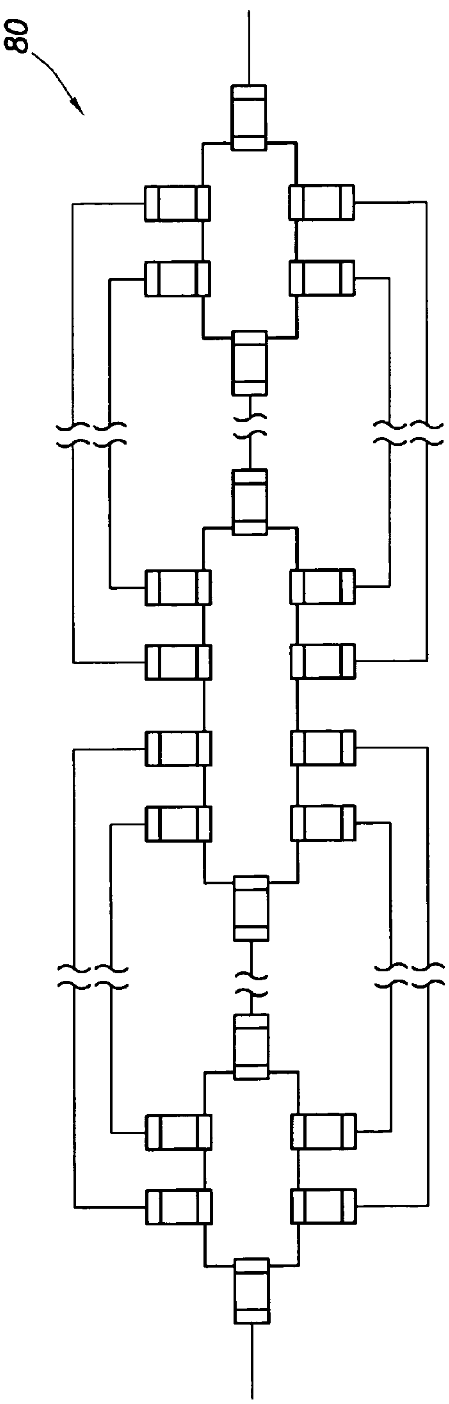
FIG. 8 shows an embodiment of an adjustable signal path circuit having five possible signal paths within each cluster or group.

As discussed with respect to the embodiments exemplified in FIGS. 5–7, each cluster of signal paths in these adjustable signal path circuits 80 have three possible signal pads for the clock or other control signals to travel across each cluster. In embodiment of FIG. 7, it is shown that an additional cluster, in FIG. 7 to make a total of three clusters, may be added to increase the total number of possible selections from the adjustable signal path circuit. However, it must be understood that the embodiments of the present invention are not limited to signal path circuits having clusters with only three signal paths. FIG. 8 shows another two cluster embodiment of an adjustable signal path circuit 80 where each cluster has a total of five possible signal paths within each cluster. A two cluster, five signal path per cluster embodiment, such as that shown in FIG. 8, gives 25 possible unique paths. Just like the embodiments where additional clusters are added to the three signal path clusters circuits, additional clusters may be added to this five signal path cluster embodiment for additional flexibility in the design of signal and clock path lengths.

The above discussion is meant to be illustrative of the principles and various embodiments of the present invention. Numerous variations and modifications will become apparent to those skilled in the art once the above disclosure is fully appreciated. For example, the solder pads shown in the various exemplary drawings are square or rectangular; however, these pads need not take any particular shape so long as the zero ohm resistors which electrically couple the solder pads to the selected paths of the clusters may be soldered to the pad. In that vein, it must be understood that the zero ohm resistors may be soldered on one end directly to the solder pad, and on their second end to the particular trace. There may however be an individual resistor pad overlapping the solder pad, but this need not be the case. Further, there very likely will be a resistor pad electronically contacting the particular trace. Likewise, discussions of the preferred embodiment of the present invention are directed to controlling the timing with respect to control or clock signal; however, the adjustable signal path circuits of the preferred embodiments may be implemented in any location in a computer system where timing of a signal needs to be delayed by the addition of length in that signal's propagation path. Further, although the preferred embodiments are discussed with respect to a computer system such as a desk top or server system, the term computer system shall not be limited to these devices and may include other digital systems such as hand held computers, palm type organizers, cellular phones, and the like. It is intended that the following claims be interpreted to embrace all such variations and modifications.

What is claimed is:

1. A computer system, comprising:

a control signal source;

a control signal destination;

a control signal path having a length, the control signal path coupling the control signal source and control signal destination, comprising:

a first plurality of signal paths each having two ends, a source end of a selected path of the first plurality of signal paths coupled to the control signal source;

a second plurality of signal paths each having two ends, a destination end of a selected path of the second plurality of signal paths coupled to the control signal destination;

a spanning circuit coupling the selected path of the first plurality of signal paths to the selected path of the second plurality of signal paths the spanning circuit comprising:

a medial solder pad;

a first zero ohm resistor connecting a remaining end of the selected path of the first plurality of signal paths to the medial solder pad; and a second zero ohm resistor connecting a remaining end of the selected path of the second plurality of signal paths to the medial solder pad; and wherein the length of the control signal path is at least the sum of a length of the selected path of the first plurality of signal paths and a length of the selected path of the second plurality of signal paths.

2. The computer system as defined in claim 1 wherein the coupling between the control signal source and the source end of selected path of the first plurality of signal paths further comprises:

a source solder pad coupled to said control signal source;

a zero ohm resistor connecting the source solder pad to the source end of the selected path of the first plurality of signal paths.

3. The computer system as defined in claim 1 wherein the coupling between the control signal destination and the selected path of the second plurality of signal paths further comprises:

a destination solder pad coupled to said control signal destination;

a zero ohm resistor connecting the destination solder pad to the destination end of the selected path of the second plurality of signal paths.

4. The computer system as defined in claim 1 further comprising:

the control signal source is a clock source;

the control signal destination is a memory controller;

the control signal path is a clock signal path; and wherein the memory controller uses a clock signal propagating on the clock signal path as a read clock for reading data from a memory bus.

5. The computer system as defined in claim 1 further comprising:

the control signal source is a feedback output of a phased locked loop (PLL);

the control signal destination is a feedback input of the PLL; and the control signal path is a feedback path of the PLL, and the length of the feedback path controls a phase relationship between an input signal to the PLL and an output signal of the PLL.

6. The computer system as defined in claim 1 wherein at least two of the first plurality of signal paths have different lengths.

7. The computer system as defined in claim 6 wherein at least two of the second plurality of signal paths have different lengths.

8. The computer system as defined in claim 1 wherein each of the first plurality of signal paths have different lengths.

9. The computer system as defined in claim 8 wherein each of the second plurality of signal paths have different lengths.

10. The computer system as defined in claim 9 wherein each of the first and second plurality of signal paths have different lengths.

11. The computer system as defined in claim 10 wherein lengths of each of the signal paths in the first and second plurality of signal paths are selected so that each unique path through the control signal path has a unique length.

12. A method of adjusting timing of a control signal from a signal source to a signal destination, comprising:

coupling an adjustable signal path circuit having a plurality of possible signal path lengths between the signal source and the signal destination;

adjusting a length of a signal path through the adjustable signal path circuit to selectively add time delay to the control signal comprising:

selecting a first signal path in a first cluster of possible signal paths, said first signal path having a length;

selecting a second signal path in a second cluster of possible signal paths, said second signal path having a length, the selecting comprising:

coupling a source end of the first signal path to the control signal source using a zero ohm resistor;

coupling a second end of the first signal path to a second end of the second signal path using a zero ohm resistor; and coupling a destination end of the second signal path to the control signal destination using a zero ohm resistor;

coupling the first and second signal paths; and forcing the control signal to propagate along the overall signal path having a length comprising the lengths of the first and second signal paths.

13. The method as defined in claim 12 wherein coupling the second end of the first signal path to a second end of the second signal path further comprises:

connecting the second end of the first signal path to a medial solder pad using a zero ohm resistor; and connecting the second end of the second signal path to the medial solder pad using a zero ohm resistor.

14. The method as defined in claim 13 wherein coupling a source end of the first signal path to the control signal source further comprises:

coupling the control signal source to a source contact pad; and connecting the source end of the first signal path to the source contact pad by way of a zero ohm resistor.

15. The method as defined in claim 13 wherein coupling a destination end of the second signal path to the control signal destination further comprises:

coupling the control signal destination to a destination contact pad;

connecting the destination end of the second signal path to the destination pad by way of a zero ohm resistor.

16. The method as defined in claim 12 further comprising:

selecting a unique length for each of the first cluster of possible signal paths;

selecting a unique length for each of the second cluster of possible signal paths; and selecting said unique lengths for the first and second clusters of possible signal paths such that each combination of the first and second signal paths have unique lengths.

17. A computer system comprising:

a control signal source;

a control signal destination;

a control signal path having a length, the control signal path coupling the control signal source and control signal destination, comprising:

a first plurality of signal paths, a source end of a selected first path of the first plurality of signal paths coupled to the control signal source;

a second plurality of signal paths, a destination end of a selected second path of the second plurality of signal paths coupled to the control signal destination;

a third plurality of signal paths;

a first spanning circuit coupling the selected first path to a selected third path of the third plurality of signal paths; and a second spanning circuit coupling the selected third path to the selected second path;

wherein the length of the control signal path is at least the sum of a length of the selected first path, a length the selected second path, and a length of the selected third path.

18. The computer system as defined in claim 17 wherein the first spanning circuit further comprises:

a first solder pad;

a first zero ohm resistor connecting the first solder pad to the selected first path; and a second zero ohm resistor connecting the first solder pad to the selected third path.

19. The computer system as defined in claim 17 wherein the second spanning circuit further comprises:

a first solder pad;

a first zero ohm resistor connecting the first solder pad to the selected third path; and a second zero ohm resistor connecting the first solder pad to the selected second path.

20. The computer system as defined in claim 17 further comprising:

the control signal source is a clock source;

the control signal destination is a memory controller;

the control signal path is a clock signal path; and wherein the memory controller uses a clock signal propagating on the clock signal path as a read clock for reading data from a memory bus.

21. The computer system as defined in claim 17 further comprising:

the control signal source is a feedback output of a phased locked loop (PLL);

the control signal destination is a feedback input of the PLL; and the control signal path is a feedback path of the PLL, and the length of the feedback path controls a phase relationship between an input signal to the PLL and an output signal of the PLL.

22. The computer system as defined in claim 17 wherein only one source end of the first plurality of signal paths couples to the control signal destination.

23. The computer system as defined in claim 17 wherein only one destination end of the second plurality of signal paths couples to the control signal destination.

24. A computer system having a control signal between a first and second device, comprising:

a solder pad coupled to said first device;

a first signal path having a length;

a zero ohm resistor connecting said solder pad to said first signal path;

a second solder pad;

a second zero ohm resistor connecting said first signal path to said second solder pad;

a second signal path having a length;

a third zero ohm resistor connecting the second solder pad to said second signal path;

a third solder pad;

a fourth zero ohm resistor connecting the second signal path to the third solder pad;

wherein said third solder pad is coupled to said second device;

a first plurality of unused signal paths spanning the first and second solder pads, but not electrically connecting those pads; and a second plurality of unused signal paths spanning the second and third solder pads, but not electrically connecting those pads;

wherein said first device drives a control signal across said first and second signal paths, and wherein said second device reads said control signal; and wherein the time required for said control signal to propagate between the first and second devices is proportional to a length traveled between the two devices comprising the length of the first and second signal paths.

25. A computer system, comprising:

a microprocessor coupled to a main memory array;

a control signal source coupled to the microprocessor;

an adjustable signal delay circuit coupled between the control signal source and a control signal destination, said adjustable signal delay circuit time delays a control signal, said adjustable time delay circuit comprising:

a first plurality of signal paths each having two ends, a source end of a selected path of the first plurality of signal paths coupled to the control signal source;

a second plurality of signal paths each having two ends, a destination end of a selected path of the second plurality of signal paths coupled to the control signal destination;

a spanning circuit coupling the selected path of the first plurality of signal paths to the selected path of the second plurality of signal paths, the spanning circuit comprising:

a medial solder pad;

a first zero ohm resistor connecting a remaining end of the selected path of the first plurality of signal paths to the medial solder pad; and a second zero ohm resistor connecting a remaining end of the selected path of the second plurality of signal paths to the medial solder pad; and wherein the length of a control signal path through the adjustable time delay circuit is at least the sum of a length of the selected path of the first plurality of signal paths and a length of the selected path of the second plurality of signal paths.

26. The computer system as defined in claim 25 wherein the coupling between the control signal source and the source end of selected path of the first plurality of signal paths further comprises:

a source solder pad coupled to said control signal source;

a zero ohm resistor connecting the source solder pad to the source end of the selected path of the first plurality of signal paths.

27. The computer system as defined in claim 25 wherein the coupling between the control signal destination and the selected path of the second plurality of signal paths further comprises:

a destination solder pad coupled to said control signal destination;

a zero ohm resistor connecting the destination solder pad to the destination end of the selected path of the second plurality of signal paths.

28. The computer system as defined in claim 25 further comprising:

the control signal source is a clock source;

the control signal destination is the memory controller;

the control signal path is a clock signal path; and wherein the memory controller uses a clock signal propagating on the clock signal path as a read clock for reading data from the memory bus.

29. The computer system as defined in claim 25 further comprising:

the control signal source is a feedback output of a phased locked loop (PLL);

the control signal destination is a feedback input of the PLL; and the control signal path is a feedback path of the PLL, and the length of the feedback path controls a phase relationship between an input signal to the PLL and an output signal of the PLL.

* * * * *